United States Patent
Cargo et al.

(10) Patent No.: US 6,381,308 B1
(45) Date of Patent: Apr. 30, 2002

(54) DEVICE FOR COUPLING HEARING AID TO TELEPHONE

(76) Inventors: Charles H. Cargo, 640 Gladstone, Apt 1, Idaho Falls, ID (US) 83401; James M. Larson, 2245 Ross Ave., Idaho Falls, ID (US) 83406; Gerald P. Mill, 2255 Charlotte Dr., Idaho Falls, ID (US) 83402

( * ) Notice: Subject to any disclaimer, the term of this patent is extended or adjusted under 35 U.S.C. 154(b) by 0 days.

(21) Appl. No.: 09/452,200

(22) Filed: Dec. 2, 1999

Related U.S. Application Data

(60) Provisional application No. 60/110,838, filed on Dec. 3, 1998.

(51) Int. Cl.[7] .......................... H04M 11/00; H04M 1/00
(52) U.S. Cl. .......................... 379/52; 379/430; 381/330
(58) Field of Search ................. 379/52, 93.37, 379/430, 93.05–93.07; 381/330, 331, 312, 315, 324

(56) References Cited

U.S. PATENT DOCUMENTS

| | | | | |
|---|---|---|---|---|
| 4,701,958 A | 10/1987 | Neth | ............................. | 381/68 |
| 5,086,464 A | 2/1992 | Groppe | ....................... | 379/430 |
| 5,557,673 A | * 9/1996 | Ginzburg | ....................... | 379/52 |
| 5,796,821 A | 8/1998 | Crouch et al. | .............. | 379/430 |
| 6,181,801 B1 | * 1/2001 | Puthuff et al. | .............. | 381/330 |

* cited by examiner

*Primary Examiner*—Wing F. Chan

(57) ABSTRACT

A portable device for coupling hearing aids to a telephone, whereby the hearing aid/telephone user simultaneously receives a signal transmitted from the device to the user's hearing aid(s) while receiving an audio signal via the telephone handset. The device may inductively couple the telephone to the user's hearing aid(s), or the device may use some other method of wireless communication to couple the telephone to the user's hearing aid(s).

13 Claims, 4 Drawing Sheets

DEVICE FOR COUPLING HEARING AID TO TELEPHONE

This appln claims benefit of Provisional Appln. No. 60/110,838 filed Dec. 3, 1998.

BACKGROUND OF THE INVENTION

The present invention relates to a portable device for coupling a hearing aid to a telephone and in particular to such a device capable of simultaneously providing a wireless signal to a user's hearing aid while providing an audio signal to the user via a telephone handset.

Traditionally, telephone users suffering from a hearing deficiency were required to rely upon telecommunication devices for the deaf (TDD) products or inadequate audio amplification products while conversing via a telephone. The TDD products merely provided a typed transcript of the present telephone conversation to the hearing-deficient user on a terminal at the user's location. Thus, these TDD devices did not solve the problem of a hearing-deficient user trying to have a normal conversation via a telephone. Similarly, the audio amplification products available in the past would simply not provide sufficient audio amplification and clarity for the users to properly hear the audio signals emitted by the telephone handset. Thus, these audio amplification products were also unable to provide normal telephone operation to hearing-deficient users.

A further advancement in telephone audio enhancement devices for hearing impaired users utilizes inductive coupling techniques. These inductive coupling techniques transmit signals from a telephone or a coupling device to a user's hearing aid via electromagnetic fields.

Most hearing aids include, or may be retrofitted with, T-coils (telephone coils), internal pickup coils capable of receiving the electromagnetic signals. These T-coils are intended to pick up the electromagnetic field present in the immediate vicinity of the receiver, or speaker, in a standard telephone headset. A switch on the hearing aid allows the user to select the T-coil position, which also shuts off the hearing aid's microphone. The hearing aid's internal circuit amplifies the current induced in the T-coils. The hearing aid user then hears the sounds through the hearing aid itself. This eliminates the background noise normally present when hearing aid users are using the telephone.

The quality and volume of sound from the telephone when using T-coil equipped hearing aids is often less than adequate. This is particularly true for people with moderate to severe hearing loss. Poor coupling between the T-coil and an often-weak electromagnetic field are the primary causes of the inadequate performance.

Prior art discloses devices utilizing available induction and hearing aid techniques to allow hearing impaired persons to use telephones. These previous attempts to provide coupling between a telephone and a hearing aid have relied on a direct connection of a small induction coil to the telephone without amplification. The user must place this coil between the head and the ear in close proximity to the hearing aid.

U.S. Pat. No. 5,086,464 to Groppe discloses a telephone headset for the hearing impaired. The headset includes a left and a right earpiece/speaker, a microphone or magnetic induction pickup input device and an amplifier connected between the input device and the speakers. The headset also includes independent volume and tone controls for the left and right earpieces/speakers. In operation, a user places the telephone receiver against the microphone or magnetic induction pickup input. The headset receives the signal and provides and audio signal to both of the user's ears.

U.S. Pat. No. 5,796,821 to Crouch et al. discloses a hearing aid telephone interconnect system which enables hearing aid users to use conventional telephone equipment. The system includes an adapter box connected between a telephone base unit and a telephone receiver. The system also includes a T-coupler connected to the adapter box. The adapter box includes a selector switch which enables a user to choose between using the telephone receiver or the T-coupler. In operation, if a user selects the telephone receiver position on the selector switch, the user utilizes the telephone in a normal manner. However, if the user selects the T-coupler position on the selector switch, the user must utilize the T-coupler. To utilize the T-coupler, the user clips the T-coupler over the user's hearing aid. The proximity of the T-coupler to the hearing aid provides an inductive coupling between the two devices. Thus, voice signals received by the telephone base unit are transmitted to the user's hearing aid input T-coil via an electromagnetic field. The hearing aid then provides audio signals to the user's ear.

Other manufacturers have equipped telephones with T-coil communication hardware which communicates with a user's hearing aid directly or via an external induction loop. To benefit from the T-coil equipped telephone, a hearing aid user must replace each of the user's own telephones with a T-coil equipped telephone. Replacing existing telephones with a T-coil equipped telephone may be problematic in certain telephone networks, especially multiple-telephone business networks, which require a specific telephone model for compatibility. In such networks, the T-coil equipped telephones may not be compatible with the network and, therefore, may not operate properly with the network.

While the above references disclose various types of telephone audio enhancement devices, none of the prior art discloses a portable device for coupling a hearing aid to a telephone, wherein the portable device provides a wireless coupling device for transmitting signals to a user's hearing aid while simultaneously enabling a user to hear the audio signal from the telephone handset.

Additionally, none of the prior art discloses a portable device for coupling a telephone to a hearing aid while providing the following features: binaural hearing; amplification; multiple induction coil options (neck loop, chairback loop, powered floor pad loop, powered desk pad loop, FM transmitter coupling, and infrared coupling); and sound volume control.

The present invention provides an alternate means to generate an electromagnetic field that can be picked up and amplified by standard T-coils. In addition, the electromagnetic field can be picked up by the hearing aids of both ears when using hearing aids in both ears. This takes advantage of the well-known ability of the brain to discriminate speech that is input through both ears simultaneously (binaural) with greater accuracy than with monaural input. When using the invention with only a single hearing aid, the user still has the ability of using the normal telephone handset with the ear not having the hearing aid. This also provides the benefits of binaural hearing.

The present invention also provides feedback of the user's own voice into the hearing aid. Those with moderate to severe hearing loss will be able to more accurately monitor the loudness of their own voice. This makes the telephone more agreeable to the listener on the other end of the line.

Additionally, the present invention provides a means to regulate the strength of the transmitted signal, thereby adjusting the sound volume in the ear. This alleviates the need for the user to adjust the hearing aid volume when using the telephone and then having to readjust the hearing aid volume back to its normal listening volume when the telephone conversation has ended. The telephone will always be set at the appropriate loudness level. When the present invention is attached to the telephone, the present invention is totally transparent to normal telephone use. It does not affect the signal to the handset and does not impact the normal hearing telephone user.

Further, the present invention provides a portable device for coupling a standard telephone with a user's hearing aid, wherein the device is compatible with telephones having a telephone handset detachably connected to a telephone base unit via a handset cord.

Still further, circuitry in the present invention provides a means to automatically shut off power to the device after a period of inactivity, thereby extending battery life. Finally, the circuitry also has built in isolation features to meet the electrical isolation requirements of the Federal Communication Commission (FCC) for devices connected to telephone equipment.

The present invention relates to a portable device for coupling a hearing aid to a telephone, comprising signal processing circuitry interfaced between a telephone base unit and a telephone handset and an hearing aid communication device connected to the signal processing circuitry. The device is capable of simultaneously providing an output to the hearing aid communication device while providing an audio output to the telephone handset.

An object of the present invention is to provide a portable device for coupling a hearing aid to a telephone, wherein the device may be inductively coupled with a user's hearing aid, providing an electromagnetic signal to the user's hearing aid, while simultaneously providing an audible signal to the user via the telephone handset.

Another object of the invention is to provide such a device for coupling a hearing aid to a telephone, wherein the device includes an amplifier for amplifying the inductive signal provided by the device to the user's hearing aid.

A further object of the invention is to provide a portable device for coupling a telephone to a hearing aid and simultaneously providing an inductive signal and an audible signal to a user, wherein the inductive signal is provided by a neck loop.

Still another object of the invention is to provide a portable device for coupling a telephone to a hearing aid and simultaneously providing an inductive signal and an audible signal to a user, wherein the inductive signal is provided by an external amplifier and floor-mounted inductive loop or a desk-mounted inductive loop.

An additional object of the invention is to provide a portable device which uses radio wave signals or light wave signals to communicate with a user while simultaneously providing an audio signal via the the telephone handset.

Still a further object of the invention is to provide a portable device for simultaneously inductively coupling a telephone to two hearing aids.

A still additional object of the present invention is to provides a portable device for coupling a standard telephone with a user's hearing aid, wherein the device is compatible with all telephones having a telephone handset detachably connected to a telephone base unit via a handset cord.

Finally, it is an object of the present invention to provide a portable device for coupling a hearing aid to a telephone, wherein the device provides full isolation between the device and the telephone, the device provides an automatic, timed shutoff feature, and wherein the volume of the signal provided to the hearing aid may be adjusted by a control on the device.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

The present invention is directed to a portable device for coupling a hearing aid to a telephone, comprising signal processing circuitry interfaced between a telephone base unit and a telephone handset and a hearing aid communication device, preferably an induction loop connected to the signal processing circuitry. The device is capable of simultaneously providing an output to the induction loop while providing an audio output to the telephone handset.

Figure 1:
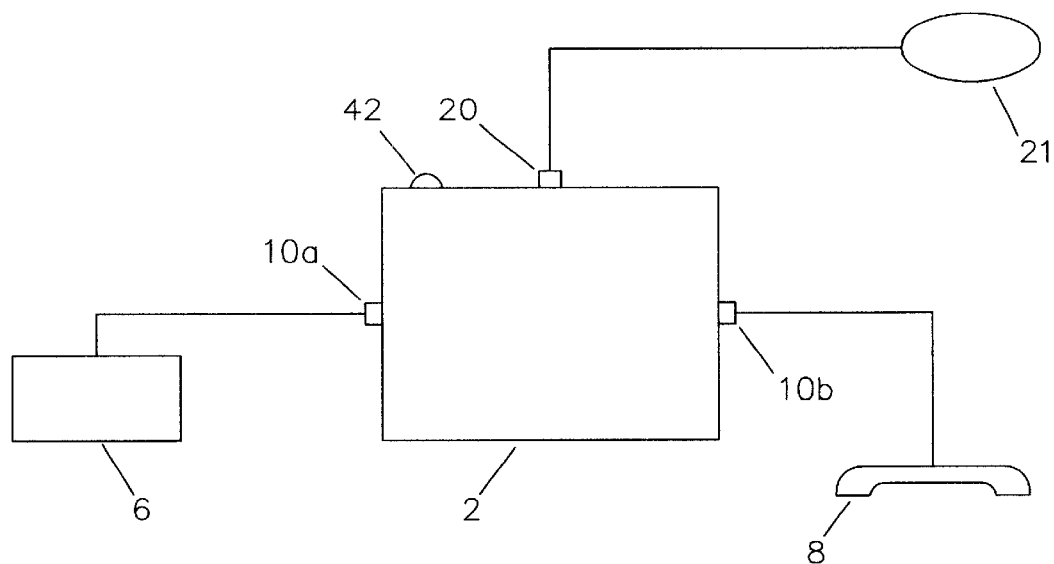
FIG. 1 is a block diagram of the preferred embodiment of the present invention.

FIG. 1 shows a block diagram of the preferred embodiment of the present invention. The telephone/hearing aid coupling device 2, a portable device, is connected between a telephone 6 and the telephone handset 8 by a first modular handset connector 10a and a second modular handset connector 10b. The coupling device 2 includes signal processing circuitry 4, shown in detail in FIG. 2, and a hearing aid communication device, preferably an induction loop 21. Generally, the coupling device 2 processes audio signals received from the telephone 6 and simultaneously provides an amplified induction signal to the induction loop 21 and an audio signal to the telephone handset 8.

Figure 2:
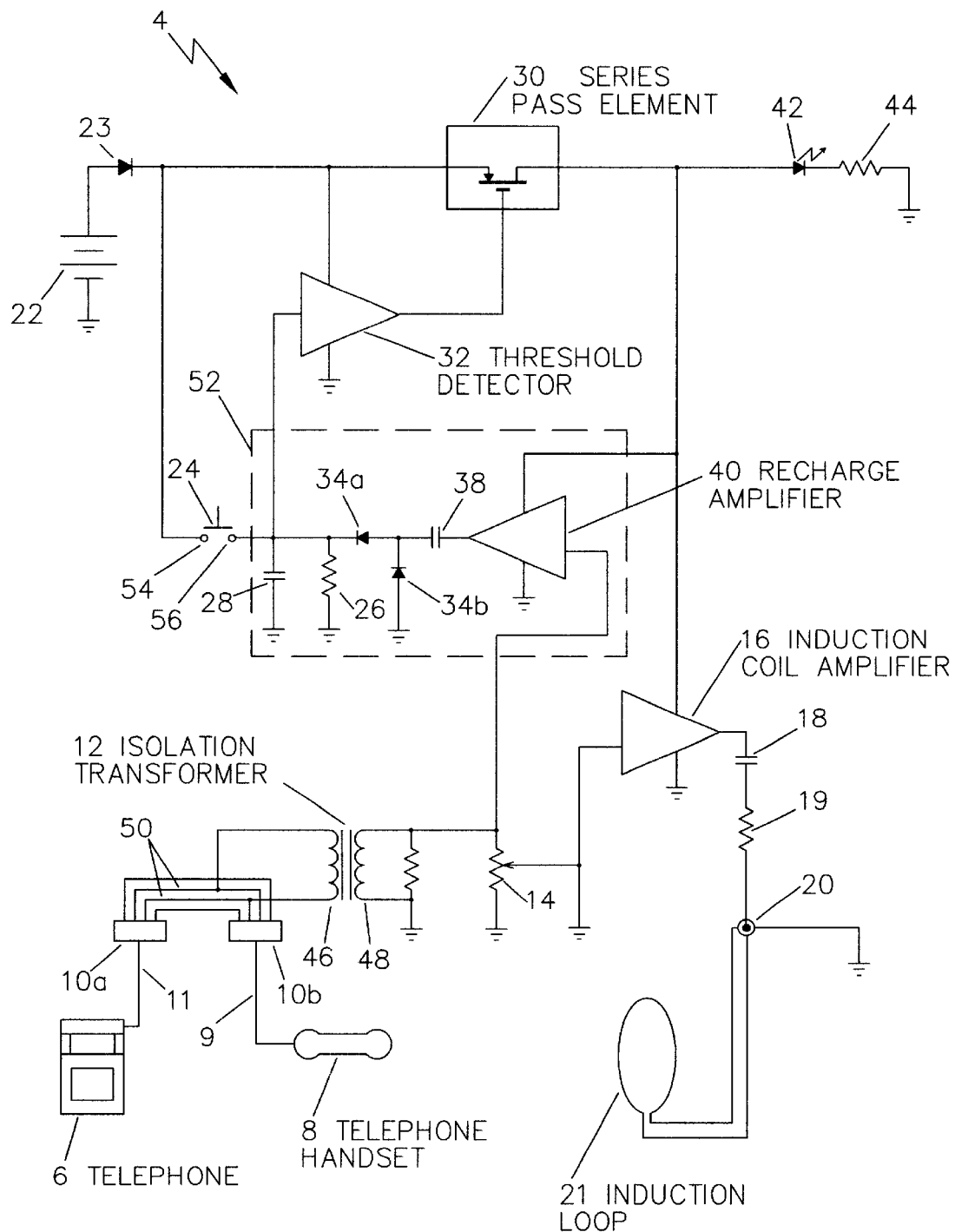
FIG. 2 is a detailed schematic diagram of the preferred embodiment of the present invention.

With reference to FIG. 2, a detailed schematic diagram of the preferred embodiment is shown. The preferred embodiment comprises signal processing circuitry 4 and an induction loop 21. The signal processing circuitry 4, enclosed in the coupling device 2, is connected to the telephone 6 by a first modular handset connector 10a. Similarly, the signal processing circuitry is connected to the telephone handset 8 by a second modular handset connector 10b.

The signal processing circuitry 4 includes an isolation transformer 12 having a primary side 46 and a secondary side 48. The primary side 46, preferably a 4 kΩ side, is connected across the audio signal wires 50 leading to the telephone handset 8. The secondary side 48 of the isolation transformer 12 is connected to an induction loop amplifier 16 through a gain control potentiometer 14. The induction loop amplifier 16 is preferably constructed from an LM-386 integrated circuit audio amplifier manufactured by National Semiconductor, however, the invention is not exclusive to the LM-386 integrated circuit.

The output of the induction loop amplifier 16 is connected to an induction loop connector 20 via an induction loop amplifier coupling capacitor 18 and an induction loop amplifier current limiting resistor 19. Although not an element of the signal processing circuitry 4, an induction loop 21 is shown in FIG. 2 attached to the induction loop connector 20. The induction loop 21 is located outside the coupling device 2, as shown in FIG. 1.

Referring again to FIG. 2, the signal processing circuitry also includes a power supply 22, preferably a 9-volt battery. The power supply 22 provides power to a MOSFET series-pass element 30 via a reverse polarity protection diode 23. The series-pass element 30 controls power to the induction loop amplifier 16.

The power supply 22 also supplies power to a threshold detector 32. The threshold detector 32, connected between the power supply 22 and the series-pass element 30, responds to signals received from a normally open, push-button switch 24 and automatic shutoff circuitry 52. The push-button switch first side 54 is connected to the power supply 22. The push-button switch second side 56 is connected to the threshold detector 32 and to the automatic shutoff circuitry 52. The automatic shutoff circuitry 52 includes a timing resistor 26, a timing capacitor 28, a first charge pump diode 34a, a second charge pump diode 34b, a charge pump capacitor 38 and a recharge amplifier 40.

The automatic shutoff circuitry 52 monitors the operation of the coupling device 2, turning off the device after a predetermined time of inactivity. When the push-button switch 24 is depressed, the switch supplies power to charge the timing capacitor 28. The positively charged side of the timing capacitor 28 is connected to a timing resistor 26, which slowly discharges the charged timing capacitor 28 to the ground connection.

The positively charged side of the timing capacitor 28 is also connected to the input of the threshold detector 32. If the charge on the timing capacitor 28 exceeds a minimum threshold value, the threshold detector 32 causes the series-pass element 30 to pass power from the power source 22 to the induction loop amplifier 16. This power enables the induction loop amplifier 16 to operate.

As shown in FIG. 2, the series pass element 30 is also connected to a light emitting diode (LED) indicator 42 which is connected to ground through a current limiting resistor 44. When power is passed through the series-pass element 30 to the induction loop amplifier 16, power is also provided to the LED indicator 42. This power illuminates the LED indicator 42, signifying that the induction loop amplifier 16 is receiving power from the power source 22.

As discussed above, when the charge on the timing capacitor 28 exceeds a minimum threshold value, the induction loop amplifier 16 receives power through the series-pass element 30. However, when the charge on the timing capacitor 28 does not exceed a minimum threshold value, the series-pass element 30 will not pass power to the induction loop amplifier 16 or to the LED indicator 42. This situation occurs after the normally open push-button 24 has been released for a sufficient amount of time allowing the timing resistor 26 to discharge the charge on the timing capacitor 28 below the minimum threshold value required by the threshold detector 32. In this situation, the induction loop amplifier 16 will not operate.

Referring again to FIG. 2, the input of the recharge amplifier 40 is connected to the secondary side 48 of the isolation transformer 12. The isolation transformer 12 provides audio signals from the telephone 6 to the recharge amplifier 40. The output of the recharge amplifier 40 is connected to the threshold detector 32 via the charge pump capacitor 38, the first charge pump diode 34a and the second charge pump diode 34b.

In operation, the portable coupling device 2 is first connected to the telephone 6 via the first modular handset connector 10a and the second modular handset connector 10b. In its normal telephone configuration, a handset cord 9 is connected between the telephone 6 and the handset 8. In order to connect this device to the telephone, this handset cord 9 is disconnected from the telephone 6 and connected to the second modular handset connector 10b. This connects the telephone handset 8 to the coupling device 2. An interface cable 11 is connected between the telephone 6 and the first modular handset connector 10a. In this manner, the coupling device 2 is connected to the telephone 6. However, if the user wishes to use the coupling device 2 with another telephone 6, the user must merely disconnect the coupling device 2 from the existing telephone 6 and handset 8 and connect the coupling device 2 with the user's other telephone 6 and handset 8.

When the user wishes to use the coupling device 2 either to place a telephone call or to answer an incoming call, the user will momentarily press the push-button switch 24. This will cause power from the power supply 22 to be applied to the positive side of the timing capacitor 28. This action will charge the timing capacitor 28 and result in the application of the voltage to the input of the threshold detector 32. As long as this voltage is above a threshold value, the threshold detector 32 will provide an output to the series-pass element 30.

When the push-button switch 24 is released, the timing resistor 26 will start draining the charge from the timing capacitor 28. The voltage applied to the threshold detector circuit 32 will remain above the threshold for a predetermined time, preferably approximately 45 seconds, before the threshold detector circuit 32 output turns off. However, the threshold detector 32 will not turn off if the timing capacitor 28 is recharged by the charge pump as described in detail below. With a signal applied from the output of the threshold detector 32 to the input of the series-pass element 30, power is passed to the induction loop amplifier 16 and to the LED indicator 42.

When a user is conversing on the telephone 6, the telephone 6 generates and/or amplifies an audio signal. The telephone 6 sends this signal to a receiver in the telephone handset 8. The coupling device 2 taps into this signal to provide a sound signal to the induction loop amplifier 16 and to provide a signal to the recharge amplifier 40.

The recharge amplifier 40 produces an alternating current output proportional to its input. This current is passed through the charge pump capacitor 38. On the positive portion of the alternating current, the first charge pump diode 34a passes the current to replenish the charge on the timing capacitor 28. On the negative portion of the alternating current, the second charge pump diode 34b provides a recharge path for the charge pump capacitor 38. In this manner, the charge on the timing capacitor 28 is replaced to make up for the discharge through the timing resistor 26.

The threshold detector circuit 32 continues to produce an output as long as the telephone 6 generates a signal. The output maintains power to the induction loop amplifier 16. This power allows the coupling device 2 to continue operating as long as the telephone 6 is in use. When the telephone 6 does not provide an audio signal for longer than a predetermined period of time, preferably 45 seconds, the coupling device 2 will automatically shut off. This feature conserves power and prolongs the life of the power supply 22.

While the telephone 6 transmits the audio signal to the recharge amplifier 40 via the isolation transformer 12, the telephone also transmits the audio signal to the induction loop amplifier 16 via the isolation transformer 12. A user may adjust the strength of this signal by changing the setting on the gain control potentiometer 14. The amplifier circuit 16 amplifies this signal and generates a corresponding electrical voltage that produces a current in the induction loop 21. The current flowing in this induction loop 21 generates an electromagnetic field.

Preferably, the induction loop 21 is located in close proximity to the user's hearing aid(s). The electromagnetic field generated by the induction loop 21 induces a current to flow in the T-coil in the user's hearing aid(s). The current from the coil is amplified and transduced into sound by the hearing aid(s). In this manner, the sound from the telephone 6 is reproduced in the user's ear(s). Thus, the coupling device 2 provides binaural hearing for a user having two hearing aids or a user utilizing one hearing aid and listening to the telephone handset 8 with the user's other ear.

The induction loop 21 can take many forms. One form is a loop of wire worn over the user's neck, called a neck loop. This type of loop is commonly used with special FM radio receivers for use by the hearing impaired to receive transmitted sound from a variety of sources. Alternatively, an induction loop 21 can be sewn into a piece of fabric that is draped over the back of a user's chair. This configuration allows the hearing aid user to use the invention without having to actually wear the induction loop 21 around the user's neck.

Figure 3:
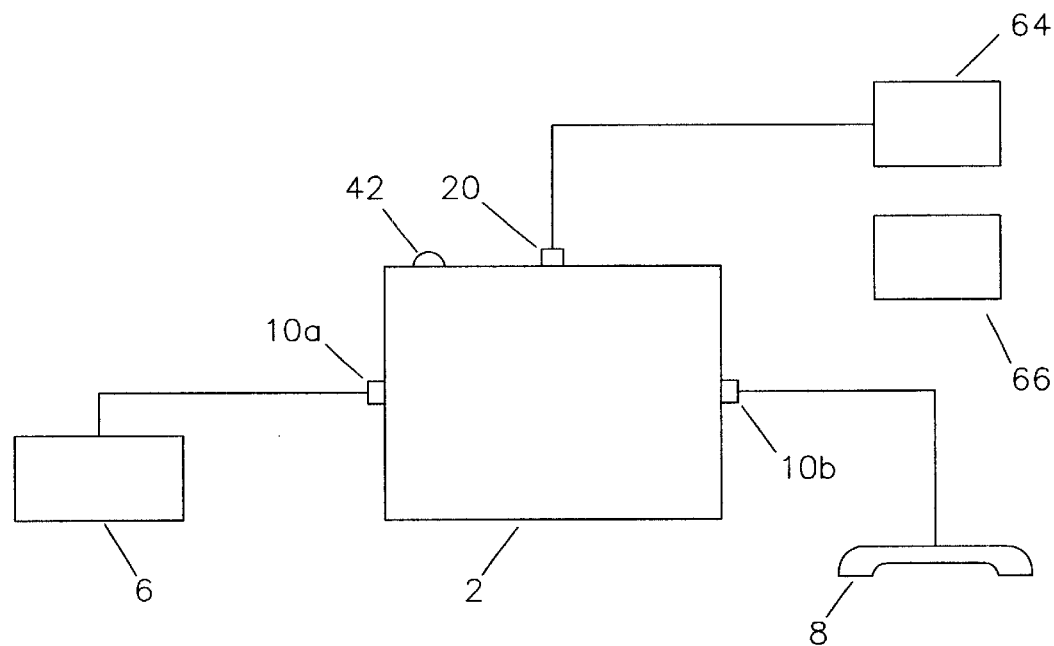
FIG. 3 is a block diagram of a second embodiment of the present invention.

As shown in FIG. 3, a second embodiment of the coupling device 2 utilizes an FM, infrared or similar transmitter 64 plugged into the induction loop connector 20. The transmitter 64 transmits the telephone 6 signal to a hearing impaired individual wearing a compatible commercially available FM, infrared or similar receiver 66. This embodiment allows the hearing aid user to use the coupling device 2 without using any wires connecting the user to the coupling device 2.

Figure 4:
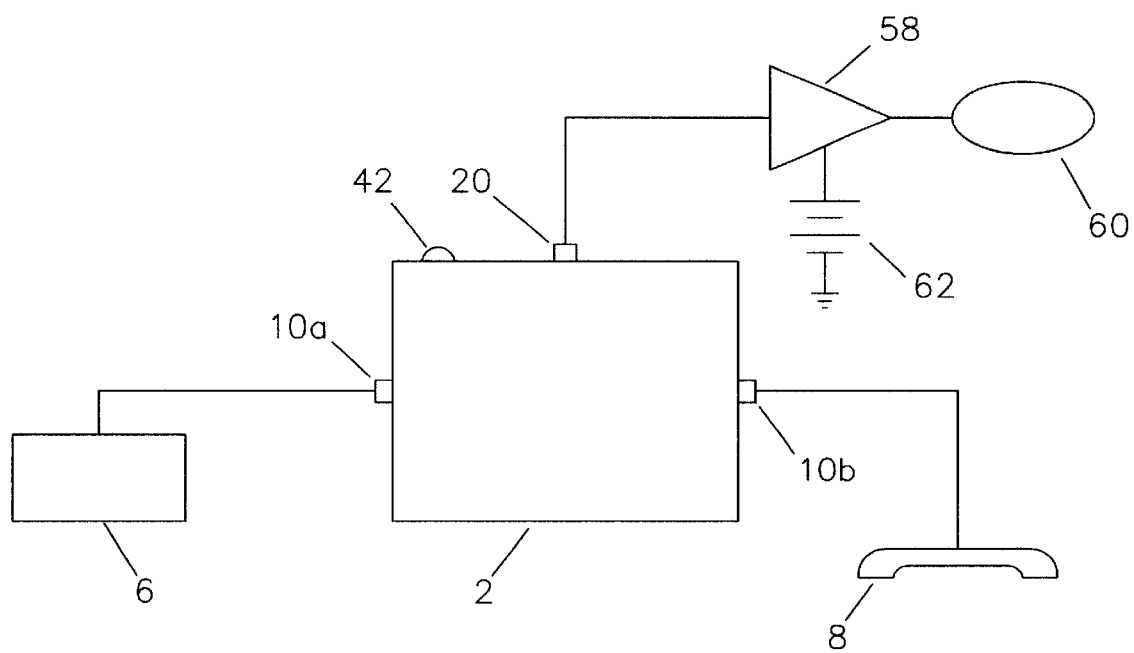
FIG. 4 is a block diagram of a third embodiment of the present invention.
Figure 5:
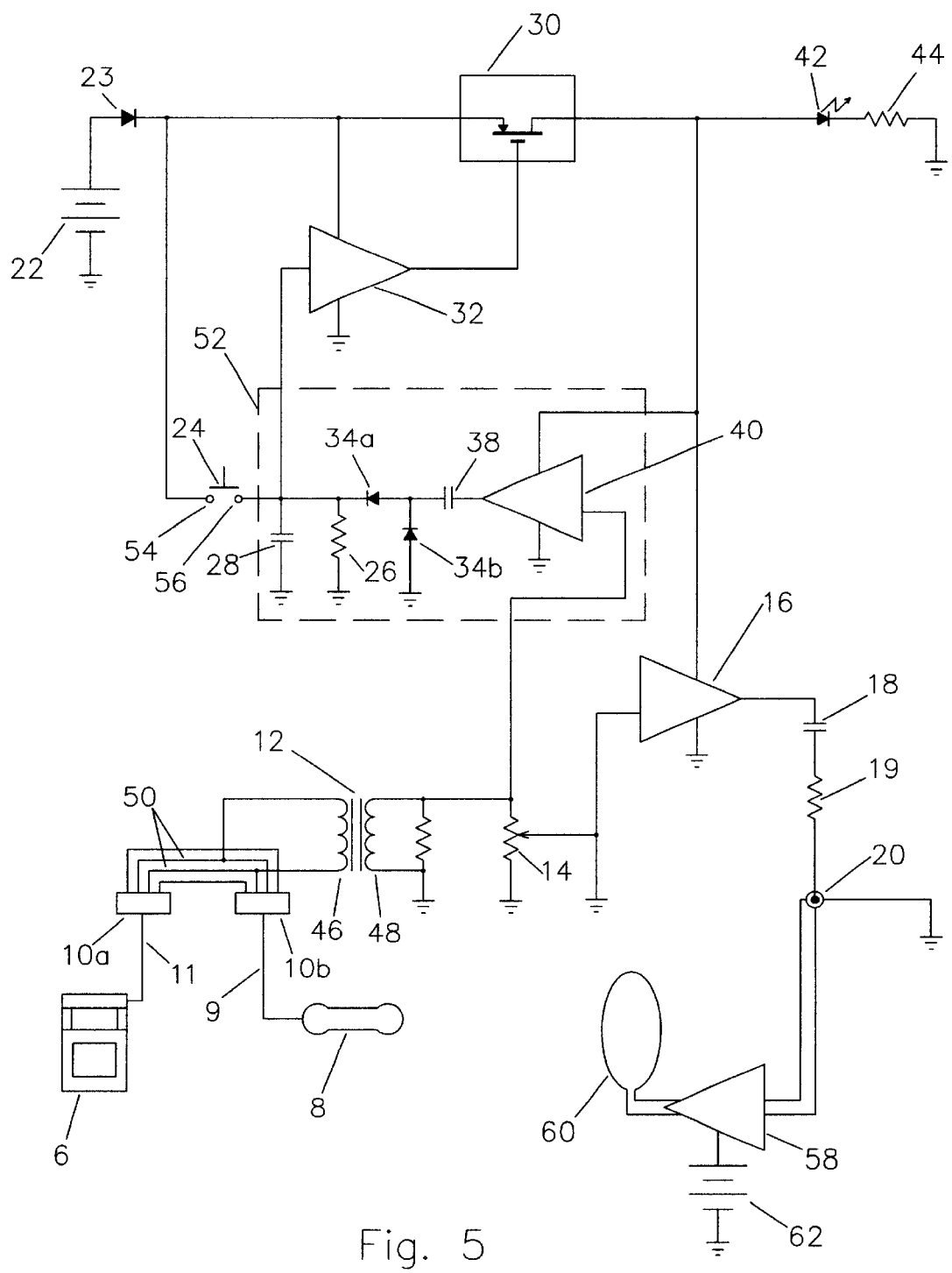
FIG. 5 is a detailed schematic diagram of a second embodiment of the present invention.

Referring to FIG. 4 and FIG. 5, a third embodiment of the present invention is shown. The coupling device 2 and the signal processing circuitry 4 in this second embodiment is identical to the coupling device 2 and the signal processing circuitry 4 shown in the preferred embodiment and in the second embodiment. Additionally, the operation of the coupling device 2 and the signal processing circuitry 4 is identical in the preferred embodiment, in the second embodiment and in the third embodiment. However, the induction loop 21 shown in FIG. 1 and FIG. 2, and the transmitter shown in FIG. 3 has been replaced in FIG. 4 and FIG. 5 by an external power amplifier 58 and a power driven loop 60.

As shown in FIG. 5, the external power amplifier 58 is connected to the coupling device 2 via the induction loop connector 20. The external power amplifier 58 receives signals from the induction loop amplifier 16 via the induction loop amplifier coupling capacitor 18, the induction loop amplifier current limiting resistor 19 and the induction loop connector 20. The external power amplifier 58 receives operating power from an external power supply 62.

Upon receiving signals from the induction loop amplifier 16, the external power amplifier 58 amplifies the signals and drives the power driven loop 60. The power driven loop 60 creates an electromagnetic field which inductively couples the power driven loop 60 with T-coils in a user's one or two hearing aids.

Preferably, the power driven loop 60 is mounted on a floor or on a desk adjacent the user of the coupling device 6. The secondary, external power amplifier 58 enables a user to mount the power driven loop 60 at a greater distance from the user's hearing aid(s) than would be possible with the induction loop 21 having no external power amplifier 58. Thus, the user may mount the power driven loop 60 under a carpet or desk-pad in the user's location. This third embodiment, like the second embodiment, allows the hearing aid user to use the coupling device 2 without using any wires connecting the user to the coupling device 2.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A portable device for coupling a hearing aid to a telephone, comprising:
    signal processing circuitry interfaced between a telephone base unit and a telephone handset, and
    a hearing aid communication device connected to the signal processing circuitry,
    wherein the device simultaneously provides an output to the hearing aid communication device while providing an audio output to the telephone handset.

2. A portable device for coupling a hearing aid to a telephone as recited in claim 1, wherein the signal processing circuitry comprises an amplifier providing an amplified output signal to the hearing aid communication device.

3. A portable device for coupling a hearing aid to a telephone as recited in claim 1, wherein the hearing aid communication device communicates simultaneously with more than one hearing aid.

4. A portable device for coupling a hearing aid to a telephone as recited in claim 1, further comprising automatic shutoff circuitry.

5. A portable device for coupling a hearing aid to a telephone as recited in claim 1, wherein the signal processing circuitry is electrically isolated to prevent interference from telephone communications.

6. A portable device for coupling a hearing aid to a telephone as recited in claim 2, wherein the hearing aid communication device comprises an induction loop.

7. A portable device for coupling a hearing aid to a telephone as recited in claim 2, wherein the hearing aid communication device comprises a radio-wave transmitter.

8. A portable device for coupling a hearing aid to a telephone as recited in claim 2, wherein the hearing aid communication device comprises a light-wave transmitter.

9. A portable device for coupling a hearing aid to a telephone as recited in claim 2, wherein the amplifier providing an amplified output signal to the hearing aid communication device is variable.

10. A portable device for coupling a hearing aid to a telephone, comprising:

signal processing circuitry interfaced between a telephone base unit and a telephone handset, wherein the signal processing circuitry includes an induction loop amplifier, and an induction loop connected to the signal processing circuitry, wherein the device simultaneously provides an amplified output to the induction loop while providing an audio output to the telephone handset.

11. A portable device for coupling a hearing aid to a telephone as recited in claim 10, wherein the induction loop amplifier is variable.

12. A portable device for coupling a hearing aid to a telephone, comprising:

signal processing circuitry interfaced between a telephone base unit and a telephone handset, wherein the signal processing circuitry includes an induction loop amplifier, an external power amplifier connected to the induction loop amplifier, and an induction loop connected to the external power amplifier, wherein the device simultaneously provides an amplified output to the external power amplifier while providing an audio output to the telephone handset.

13. A portable device for coupling a hearing aid to a telephone as recited in claim 12, wherein the induction loop amplifier is variable.

* * * * *